United States Patent
Darrieux et al.

(10) Patent No.: US 6,540,000 B1
(45) Date of Patent: Apr. 1, 2003

(54) PROCESS AND DEVICE FOR DEPOSITING IN CONTACT ROVING OF PRE-IMPREGNATED FIBERS PARTICULARLY FOR THE PRODUCTION OF COMPLEX STRUCTURES OF COMPOSITE MATERIAL POLYMERIZED BY IONIZATION

(75) Inventors: Jean-Louis Darrieux, Saint Laurent du Medoc (FR); Jean-François Fuchs, Sainte Helene (FR)

(73) Assignee: Aerospatiale Societe Nationale Industrielle, Paris Cedex (FR)

( * ) Notice: Subject to any disclaimer, the term of this patent is extended or adjusted under 35 U.S.C. 154(b) by 0 days.

(21) Appl. No.: 09/437,740

(22) Filed: Nov. 10, 1999

(30) Foreign Application Priority Data

Nov. 10, 1998 (FR) .............................. 98 14297

(51) Int. Cl.⁷ .............................. B32B 31/00
(52) U.S. Cl. .................. 156/523; 156/180; 156/468; 156/486; 156/574; 156/529
(58) Field of Search ................ 156/523, 468, 156/486, 522, 176, 180, 181, 577, 574, 579, 529

(56) References Cited

U.S. PATENT DOCUMENTS 3,574,040 A * 4/1971 Chitwood et al. .......... 156/522
4,591,402 A    5/1986 Evans et al. ................ 156/350
4,882,007 A   11/1989 Lengen et al. .............. 156/523
5,431,676 A * 7/1995 Koza et al. .................. 156/350
5,700,347 A   12/1997 McCowin .................... 156/425
5,979,531 A * 11/1999 Barr et al. .................... 156/574

FOREIGN PATENT DOCUMENTS

EP        0 846 551        6/1998

* cited by examiner

Primary Examiner—Linda Gray
(74) Attorney, Agent, or Firm—Young & Thompson

(57) ABSTRACT

A device for depositing in contact roving of pre-impregnated fibers in which at least one roving (F) is, in the course of a deposition sequence, unrolled from a spool (19) or the like, pressed and deposited on the surface (9) to be covered with the help of a deposition roller (11) or the like, then cut when the desired length of roving is deposited. Substantially from beginning to end of each deposition sequence the roving (F) is maintained in contact with the roller (11), the roving being unrolled substantially under only the tension of the roller and deposited and held, at least at the beginning and at the end of the deposition path, pressed against the surface to be covered, and, at the end of the deposition sequence, spacing the deposition roller (11) from the surface (9), then cutting the roving in its portion between the roller and the surface. Useful in the production of structures of composite material.

8 Claims, 10 Drawing Sheets

PROCESS AND DEVICE FOR DEPOSITING IN CONTACT ROVING OF PRE-IMPREGNATED FIBERS PARTICULARLY FOR THE PRODUCTION OF COMPLEX STRUCTURES OF COMPOSITE MATERIAL POLYMERIZED BY IONIZATION

FIELD OF THE INVENTION

The present invention relates to the production of structures of composite material and more precisely to pieces of more or less complex shape, constituted by the superposition on a suitable support of layers of continuous pre-impregnated fibers particularly with a resin polymerizable by ionization and emplaced by deposition in contact.

The invention relates more particularly to a new technique for deposition in contact roving of pre-impregnated fibers. By roving is meant in the present description a group of agglomerated continuous fibers in the form of a ribbon or strip, a single roving or several rovings juxtaposed to form a layer being adapted to be deposited according to the invention.

BACKGROUND OF THE INVENTION

The deposition in contact of such roving is well known and has the advantage of producing at reduced production cost pieces which can have complex shapes and comprising particularly concave portions, with the aid of deposition heads for pre-impregnated roving, for example with thermosetting resin.

However, all the heads for deposition in contact that are known, use the same technique of supplying the roving under a deposition roller consisting, to initiate a deposition sequence, impressing for example with the help of a pair of motor-driven pulleys, the free end of the layer of roving in the direction of the deposition roller so that they are pinched between this latter and the surface to be covered.

Thus, at the end of each deposition sequence, the layer must be sectioned, which takes place between the deposition roller and the supply pulleys and therefore requires, for the following deposition sequence, to "press" said layer as explained above.

For the types and natures of pre-impregnated fibers usually used for such deposition, the "pressing" of the roving has no particular difficulties or problems, because the roving or layers have a sufficient rigidity.

However, difficulties arise when the roving or layers have insufficient rigidity. Their flexibility does not permit directing them suitably toward the point of anchoring on the support to be covered. The impossibility of driving being moreover worsened in the case in which the fibers are impregnated with a resin that is stickier than the usual resins. This is particularly the case generally with ionizable resins which are polymerized, after emplacement of the roving, by ionization in a polymerization unit.

The stickier nature of the resin moreover renders problematical the relaxing of the roving applied by the tractive pulleys in conventional deposition heads.

OBJECT OF THE INVENTION

The present invention seeks precisely to solve these problems by providing a new technique for depositing in contact permitting the placement of roving which, for reasons of insufficient rigidity and/or too high sticky nature, cannot be handled by the conventional contact deposition heads for depositing in contact.

SUMMARY OF THE INVENTION

To this end, the invention has for its object a process for depositing in contact roving of pre-impregnated fibers particularly for the reduction of complex structures of composite material polymerized by ionization, in which at least one roving is, in the course of a deposition sequence, unrolled from a reel or the like, pressed and deposited on a surface to be covered with the help of a deposition roller or the like, then cut when the desired length of roving has been deposited, characterized in that it consists in maintaining substantially from one end to the other of each deposition sequence the roving in contact with said roller, the roving being unrolled substantially under only the traction of the deposition roller and maintained, at least at the beginning at the end of the path of deposition, pressed against said surface to be covered, and, at the end of the deposition sequence, spacing the deposition roller from said surface, then cutting the roving in its portion between the roller and the surface.

Preferably, and in the case particularly of roving having a highly sticky nature, between the roving spool and the deposition roller is constituted a zone for decreasing and regulating the tension of the roving generated a storage loop or reserve ensuring supply under low tension of the roving to said deposition roller.

The invention also has for its object a device for practicing the process described above, comprising a deposition head mounted on a digitally controlled machine comprising at least four axes of mobility and moveable relative to the surface to be covered and comprising a deposition roller, supply means for said roving to the deposition roller, means for breaking the roving and means for cutting the roving, characterized in that the deposition head comprises moreover means to press against the surface to be covered the portion of the deposited roving, at least at the two ends of the section of roving, in that said supply means for the roving are arranged such that the roving remains continuously in contact with the deposition roller or over a substantial portion of its peripheral surface and in that said cutting means are arranged to cut the roving downstream of the deposition roller in the direction of movement of the roving with respect to the roller.

Preferably, the deposition roller is mounted on a deposition head, movably in the direction of the surface to be covered.

According to one embodiment, said means for pressing the deposited roving against the surface to be covered are constituted by a secondary roller disposed upstream of the deposition roller, in the direction of movement of this latter relative to said surface to be covered, said secondary roller being retractably mounted.

Preferably, the secondary roller is moreover movably mounted relative to the deposition roller and controlled automatically such that, in the course of the deposition sequence, it will press the deposited roving onto the surface to be covered by rolling over at least the two end portions of the deposited section and, if desired, over all the length of said section as a function of the complexity of the pieces to be made.

The cutting means for the roving are constituted for example by a cutting member and an anvil, positioned on opposite sides of the roving in its portion extending between the deposition roller in the position spaced from the surface to be covered and a secondary roller in the pressing position of the second end of the deposited section of roving, the portion of the cutting means interposed between the roving and the surface to be covered being retractable.

The deposition head according to the invention permits depositing pre-impregnated roving whose rigidity and/or sticky character would prevent the use of conventional heads, so called roving pushers, described above. It of course also permits the deposition of pre-impregnated roving usable with such conventional heads.

The deposition head according to the invention is adaptable to any type of machine for emplacing pre-impregnated fibers for the production of composite pieces of all sizes and shapes, even the most complex, in particular those including concave surfaces and in particular for large pieces of which all or a portion of the fibers are emplaced by deposition in contact, these pieces being then subjected to polymerization by ionization.

BRIEF DESCRIPTION OF THE DRAWINGS

Other characteristics and advantages will become apparent from the following description of an embodiment of a deposition head using the process of the invention, which description is given by way of example only and with respect to the accompanying drawings, in which.

DETAILED DESCRIPTION OF THE INVENTION

Figure 10:
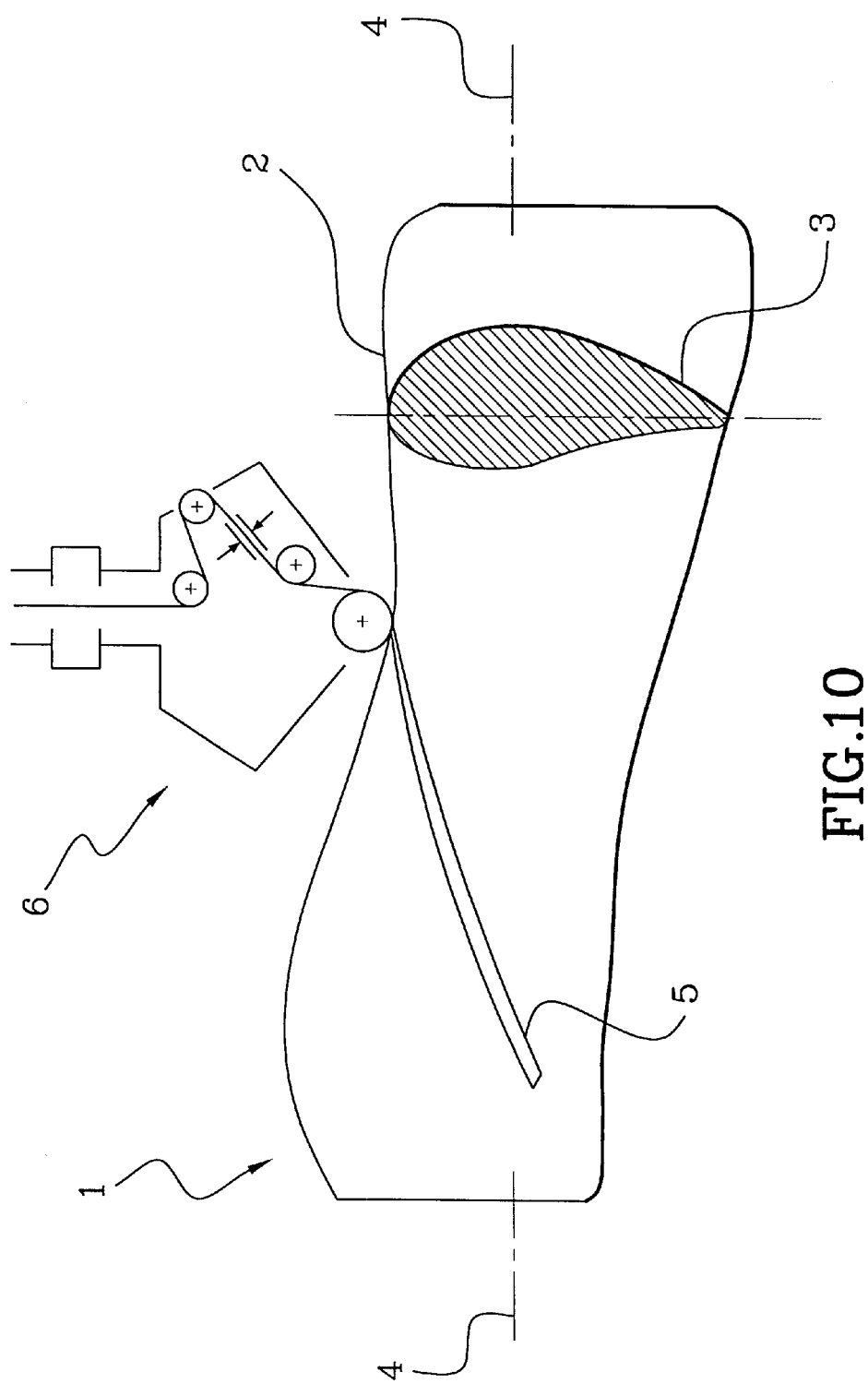
FIG. 10 shows the use of a deposition head according to the invention for the production of a piece having a complex shape.

In FIGS. 1 to 9 is shown in greater detail a head for depositing in contact, schematically shown in FIG. 10, which shows a use of the invention for the production by way of example of a piece 1 of large dimensions and of complex shape comprising particularly concave portions 2 on which it is not possible to place fibers by winding. At 3 is shown a local section of said piece 1 which is pivotally mounted about an axis 4 between two headstocks (not shown) of which one is motor driven.

At 5 is shown a roving emplaced by the deposition head 6.

By roving is meant a group of continuous filaments or fibers, agglomerated, in the shape of a ribbon or strip, stored on a spool.

Generally, several rovings are present side-by-side when forming a layer and are deposited simultaneously.

Figure 1:
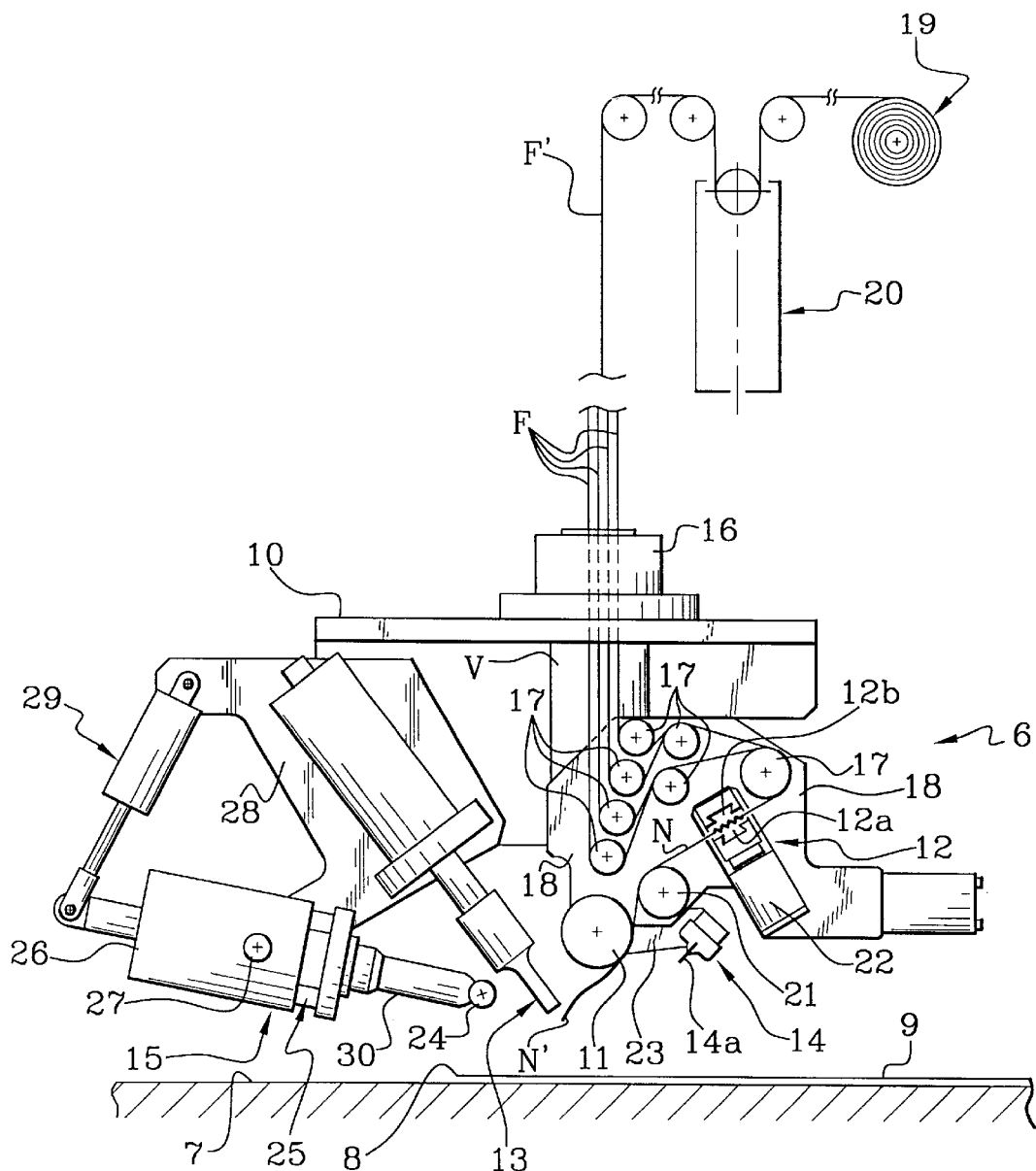
FIG. 1 is a schematic side elevational view of a deposition head according to the invention.

In FIG. 1, there is shown the contact deposition head 6 facing a surface 7 and directly over the end 8 of a first layer 9 of pre-impregnated rovings deposited on the surface 7.

The head 6 comprises a plate 10 arranged to permit the mounting of the head on a machine (not shown) comprising, according to the complexity of the piece to be made, four, five, six, seven or more axes of mobility, for example a machine of the turret, gantry, robot arm, conventional winding type, etc.

On the plate are mounted a deposition roller 11, means for supplying to this roller pre-impregnated roving, assembled to form a layer N of several juxtaposed ribbons F (four in the illustrated example) deposited simultaneously, means 12 for breaking the layer N, means 13, 14 for cutting the layer N and means 15 for pressing the layer during deposition on the surface to be covered.

The rovings F are, in the illustrated embodiment, moved in known manner through a well 16 whose axis coincides with the axis of rotation of the head 6, itself corresponding to the axis of rotation of the machine, in the direction of a set of return pulleys 17 for forming the layer N, carried by a plate 18.

Figure 2:
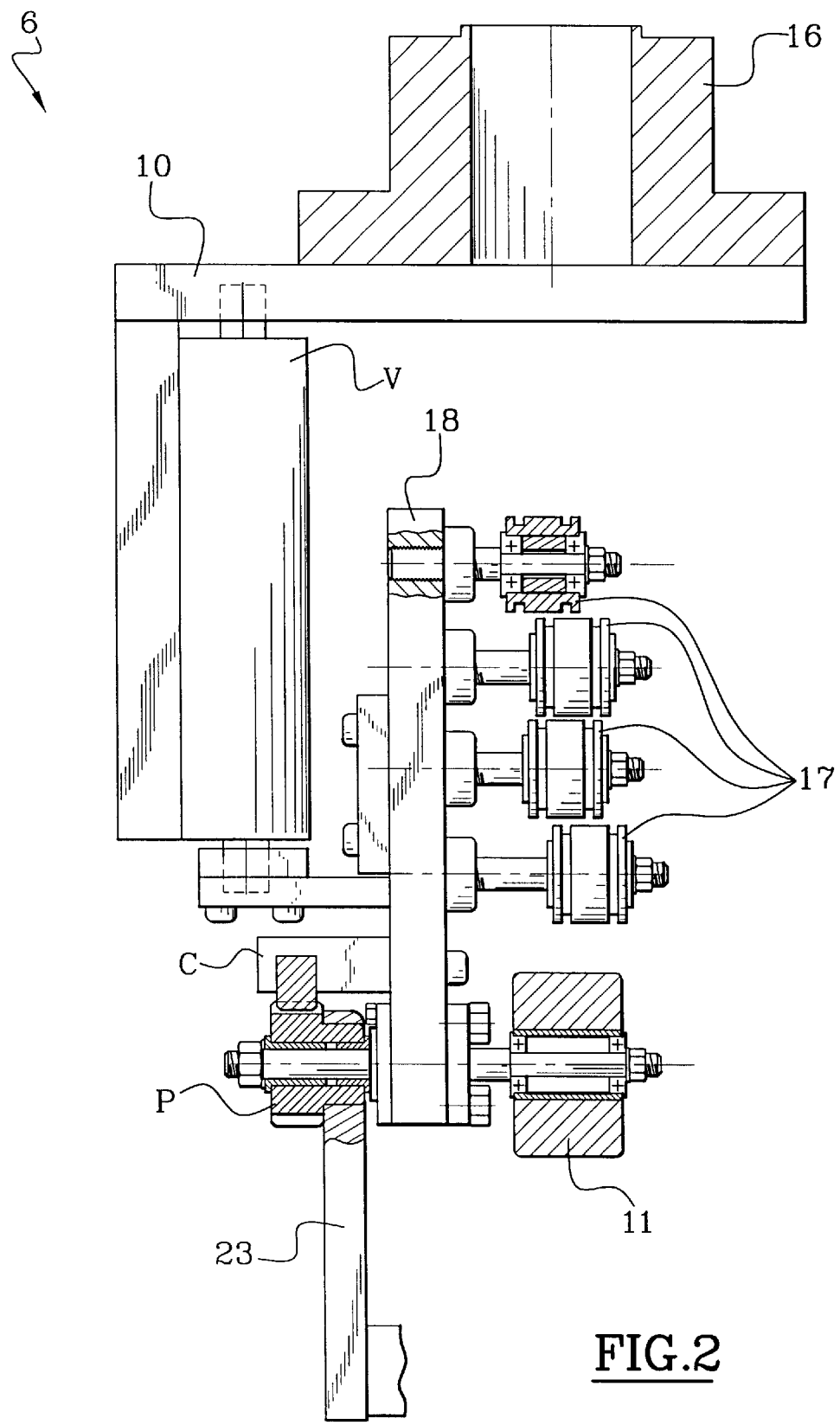
FIG. 2 is a fragmentary view from the left of the head of FIG. 1.
Figure 3:
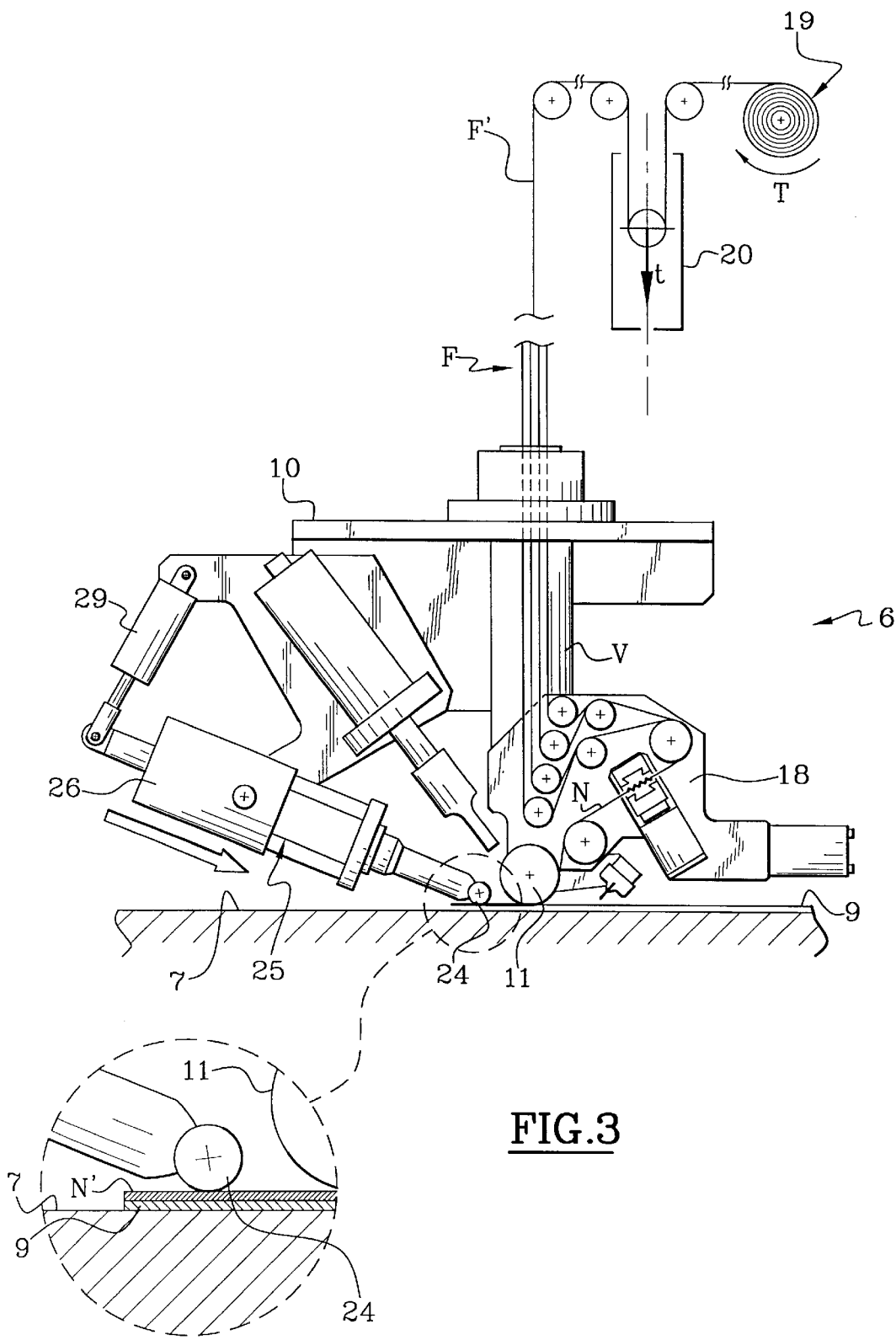
FIGS. 3 to 9 show various successive stages of a sequence of depositing roving from the head of FIG. 1.
Figure 4:
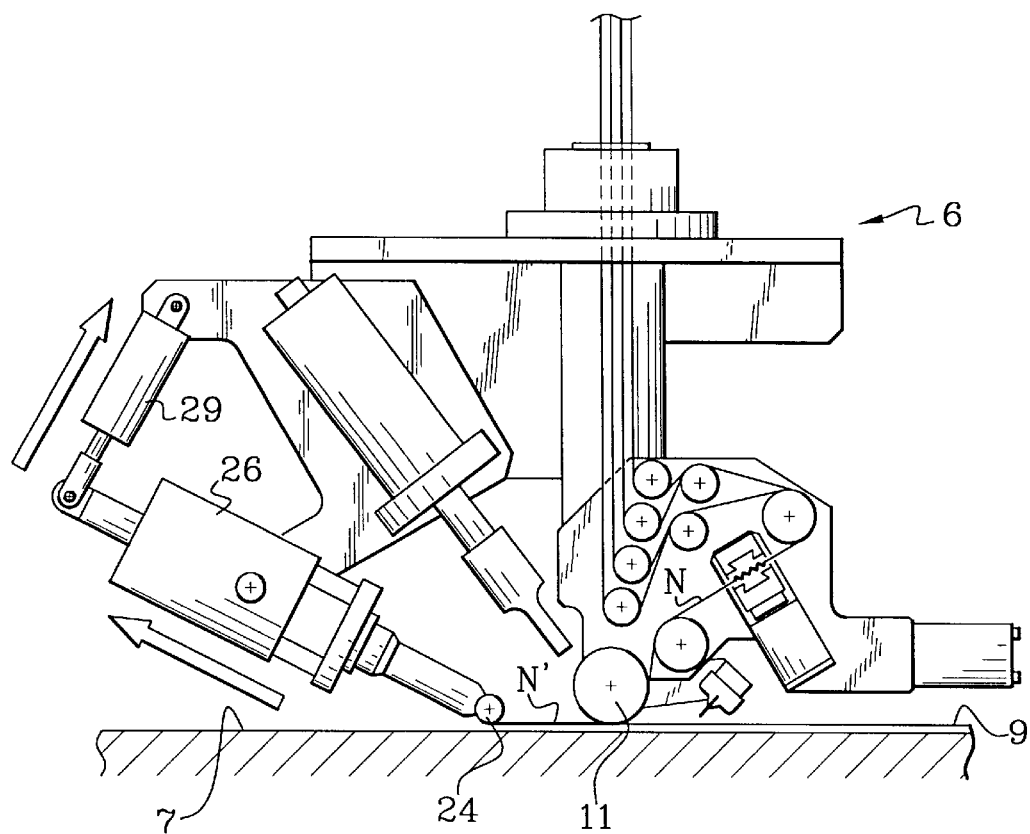
Figure 5:
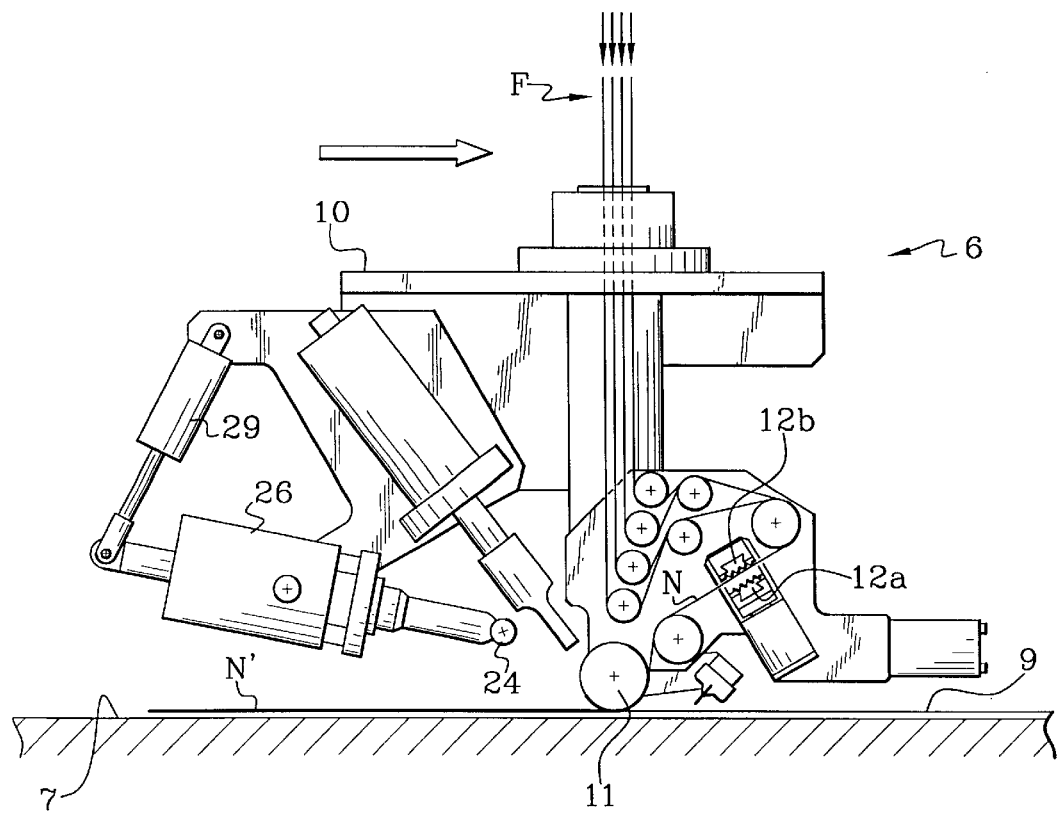
Figure 6:
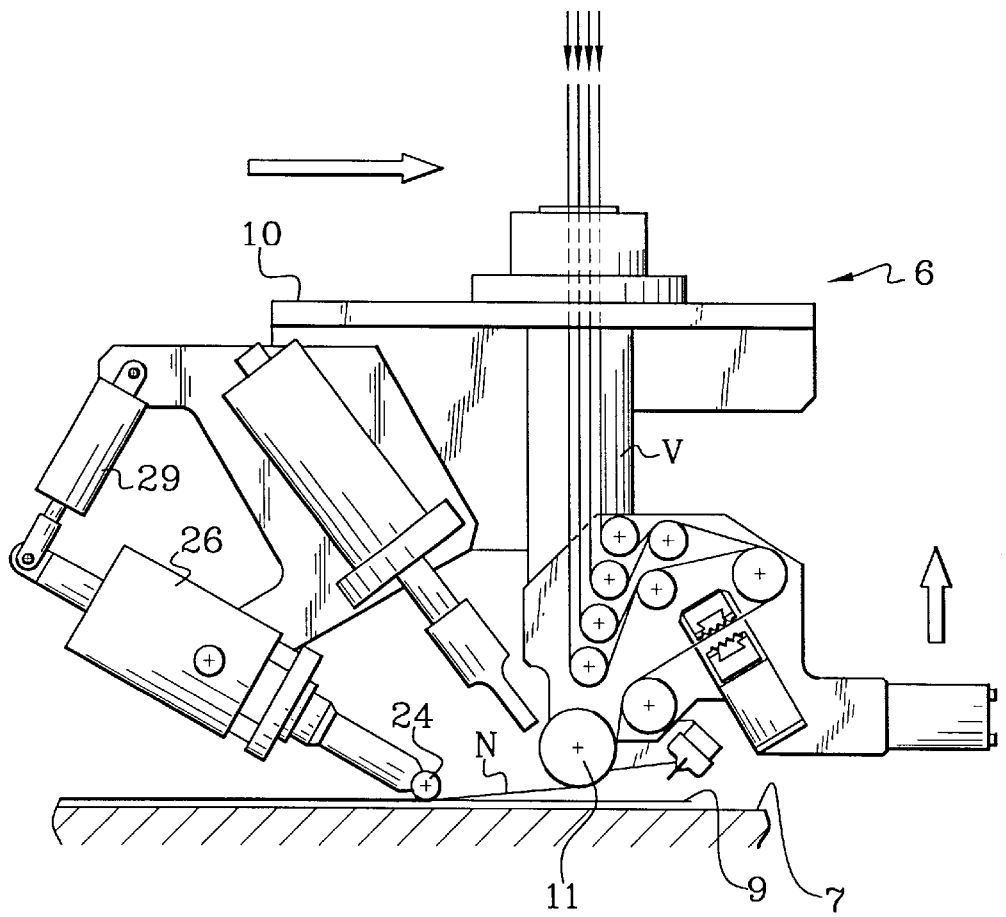
Figure 7:
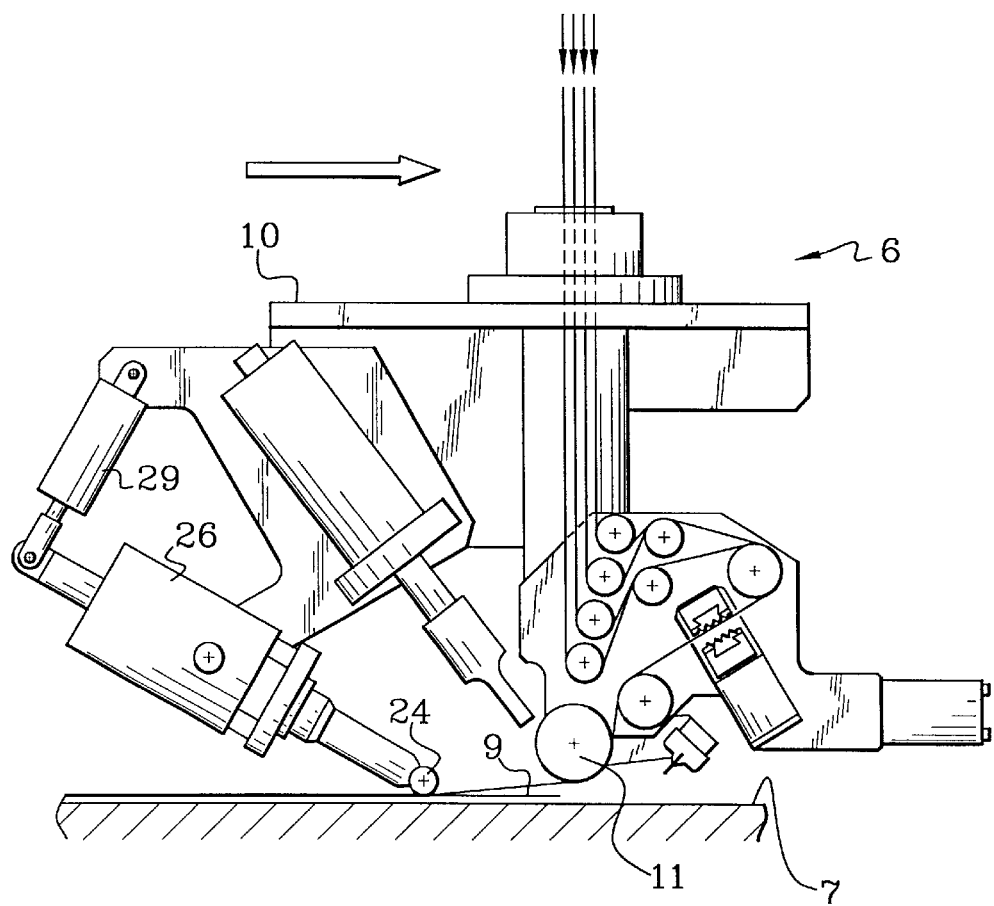

The plate 18 is movably mounted in translation in its plane relative to the plate 10 thanks to a jack V secured to said plate and whose rod is connected laterally to the plate 18 (FIG. 2).

The rovings F, symbolized by a single roving F' at the top of FIG. 1, are unrolled from several conventional spools 19, a system 20 for decreasing and regulating the tension being interposed between the spools 19 and the head 6 so as to provide a reserve ensuring a slight tension to the rovings in the course of deposition and, in the case in which the spools 19 are fixed in position, a compensation of the relative movements between the spools and the head 6 when this latter moves away from the spools to carry out a deposit.

The deposition roller 18 is carried by the plate 18, as well as an auxiliary pulley 21, interposed between the roller 11 and the last pulley 17 for forming the layer N. The pulley 21 is adapted to press the layer N over a larger surface of the roller 11 for purposes explained later.

It is to be noted that this system 20 can be omitted and replaced by a motor drive for the rollers 17, 21 and supplementally 11, for the purpose of deposition, ensuring a movement of the layer compatible with the speed of movement of the deposited layer and so as to deliver the roving with a very low tension.

Between said last pulley 17 and the pulley 21 is disposed the layer brake 12 constituted by two jaws 12a, 12b disposed on opposite sides of the layer and moved by a jack 22.

The cutting means 13, 14 for the layer N comprise an ultrasonically vibrating anvil 13 mounted fixedly and a cutting member 14 constituted for example by a thin blade 14a, mounted retractably, for example by rotation about an axis coaxial to the axis of the roller 11, the blade being fixed at the end of an arm 23, shown in FIG. 1 in a raised retracted position.

The pressing means 15 for the layer N deposited on the surface to be covered (layer 9 already having been deposited) comprises a secondary roller 24 with a floating axis, mounted at the end of the rod 25 of a sliding jack 26, itself articulated about an axle 27 on a plate 28 of the head 6.

This pivoting of the jack 26 about the axle 27 is ensured by a jack 29 anchored on the plate 28.

The control means for the brake 12, for the cutting system 13, 14, for the jacks 26 and 29, as well as for the control means of the various axes of movement of the head 6, are of course connected to a control system (not shown).

In FIG. 1, the head 6 is in the rest position, directly above the edge of the layer 9 already deposited, ready to engage a sequence of deposition on the layer 9 of a section of layer N.

Because of the sticky character of the pre-impregnated fibers of the layer N, the latter remains adherent to the deposition roller 11. The particular arrangement of the pulley 21 relative to the roller 11 has exactly for its object to increase, at rest, the surface of adherence between the roller 11 and the layer, such that between two deposition sequences, the free end of the layer N remains somewhat suspended from the roller 11, in good position for correct placement (FIG. 3) of this end on the surface to be covered.

The deposition roller 11 is first brought near the surface 9 into contact with the same, while a traction t (FIG. 4) is exerted on the untensioning system 20 to provide a reserve of roving.

During this approach, the roller 11 moves on the one hand toward the surface 7 and in the latter portion of its approach moves in the depositing direction for finally contacting the surface to be covered, like a landing maneuver.

This approach of the roller 11 is obtained by machine movements (landing).

The jack V is maintained floating in the descent of the roller 11 and is actuated only after landing, to ensure the contact pressure of the layer which will be deposited on the surface to be covered.

The end portion N' of the layer (FIG. 1) will thus be superposed on the edge of the layer 9.

The secondary roller 24 is then brought to the height of the deposition roller 11 so as to press said portion N' against the layer 9 immediately upstream of the roller 11 in the direction of movement of this latter along the surface 9.

The following step is the smoothing of said portion N' by rolling (FIG. 4) of this portion with a secondary roller 24 moving away from the roller 11 by the conjoint action of the jacks 26 and 29, the head 6 remaining motionless.

At the end of smoothing, the secondary roller 24 is retracted (FIG. 1 position) the laws 12a, 12b of the brake 12 are released and the head 6 is moved (FIG. 5) so as to press the layer N by the roller 11 against the layer 9.

The secondary roller 24 can if desired descend (this phase not being shown in FIG. 5) to roll along the layer that is being deposited and to press it firmly against the subjacent layer 9.

During all the movement of the head 6, the rovings F are tensioned by the roller 11 under a low adjustable tension predetermined by the system 20 (tension t), associated with the brake system for the spools 19 (tension T), the tension of the rovings being equal to t/2, the spools being motionless (T=0).

When the head 6 arrives (FIG. 6) at a certain distance from the other end of the layer 9 to be covered, the roller 24 being or not pressed against the layer that is being deposited, the roller 11 is slightly raised by the actuation of the jack V, such that the placement of the layer N against the layer 9 takes place only by the action of the secondary roller 24.

Figure 8:
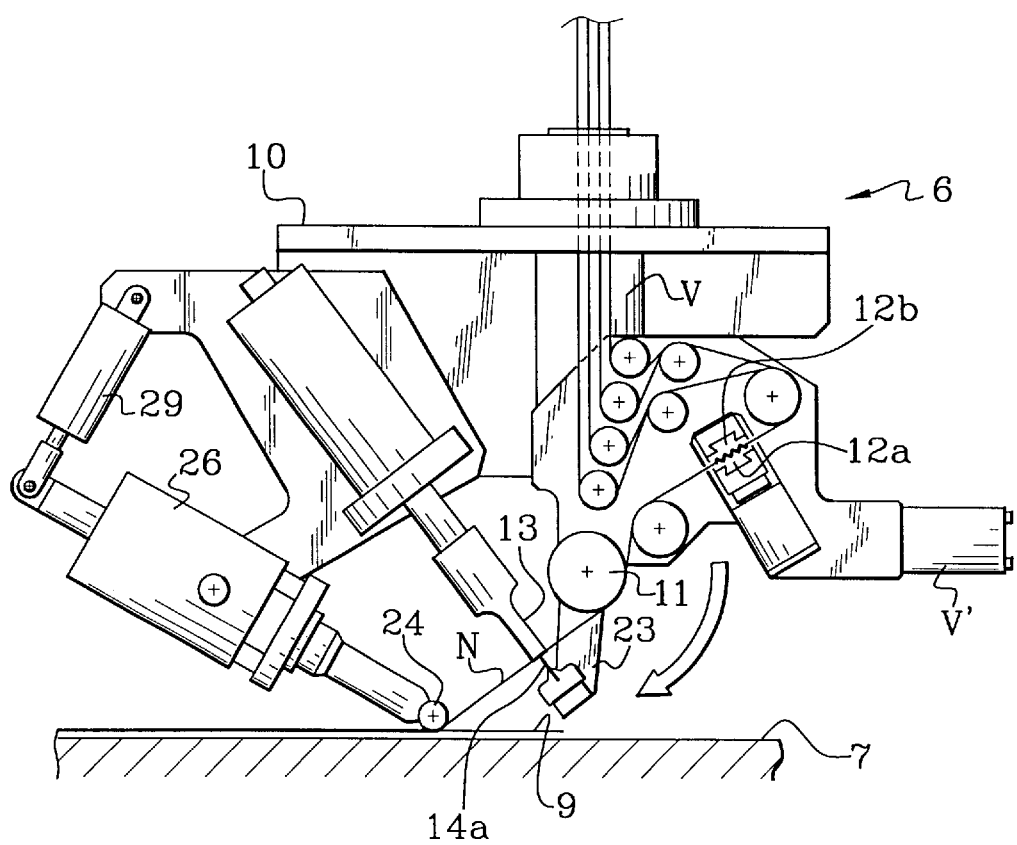
Figure 9:
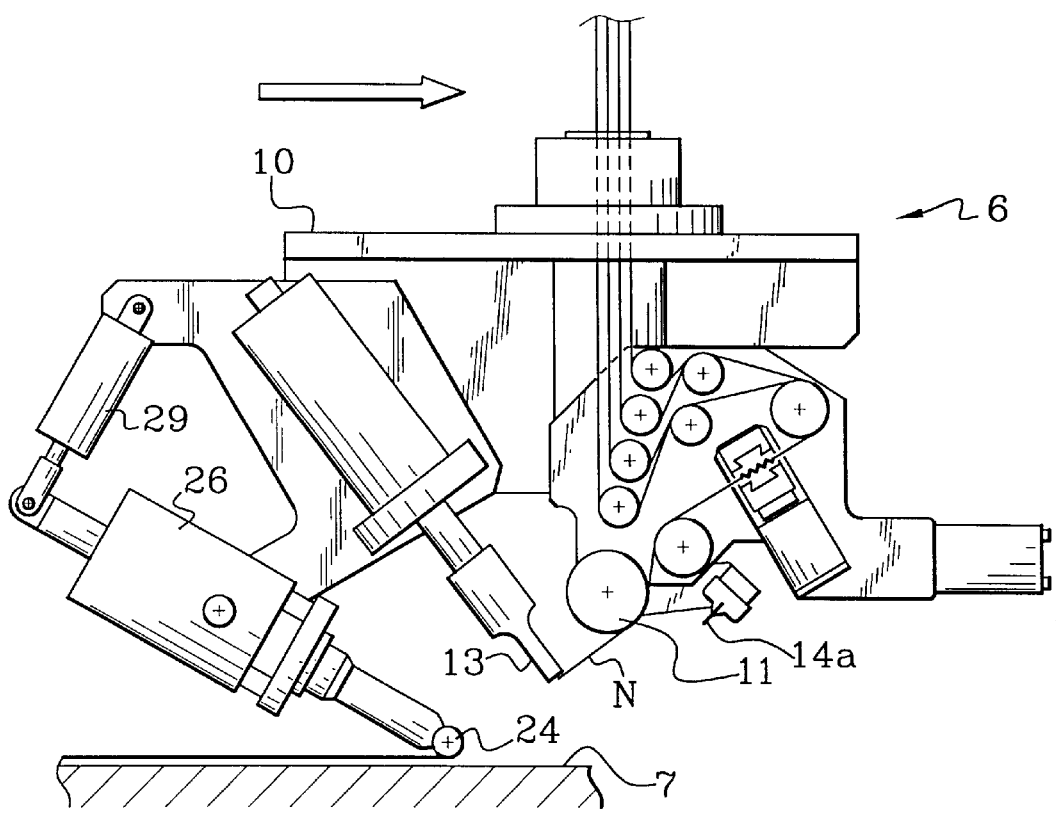

When it reaches a position (FIG. 7) directly over the other end of the layer 9, the head 6 stops, the roller 11 leaves the surface 7 by action of the jack V so as to place the section of layer N between the rollers 11 and 24 against the anvil 13 of the cutting device (FIG. 8). The cutting blade 14a is then dropped facing the anvil by pivoting of the arm 23 with the help of a jack V' adjustable as to pressure, acting by means (FIG. 2) of a rack C and a pinion P. A timing permits adjusting the duration of cutting. The vibratory frequency of the anvil 13 is also adjustable. So as to be permit the adjustment of the cutting angle of the layer N, the assembly of anvil 13 and blade 14a is adjustable by ±45° relative to an axis perpendicular to the layer, with the help for example of an electric motor controlled by the digital control of the machine.

When again raising the roller 11 for cutting the layer N, the jaws 12a, 12b are clamped.

The object of this slight raising of the roller 11 is to avoid unsticking of the end of the layer 9 previously deposited, during withdrawal of the head, once it has arrived directly over the end of the layer 9, to put it in the position for cutting the layer N.

The slight raising of the roller 11 is ensured for example by the action of the jack V whose path is stopped at the desired height by means of a retractable abutment. The final withdrawal of the roller at the end of placement, to pass to the cutting position of the layer, is thus ensured also by the jack V whose path is no longer blocked (the abutment is retracted).

When cutting has been performed, the blade 14a retracts and returns to its original position and the head 6 retraces its path of movement (FIG. 9) to permit the roller 24 to place and smooth the end section of the section of the layer which has been deposited, the cutting of the layer being of course predetermined such that the cut section exactly covers the layer 9, or not, as a function of its predetermined position on the piece to be made.

The secondary roller 24 is then retracted to the left position of FIG. 1 and the head 6 can be positioned (FIG. 1) for a new deposition sequence.

The rollers 11, 24 are preferably flexible rollers, freely rotatable and whose pressure on the compact surface can be adjusted, by adjustment of the pressure of the control jack (V, 26). The surface of these rollers can be clad with various materials both sufficiently adherent, in the case of the roller 11, that the end N' of the layer N will remain stuck to the roller 11 between two deposition sequences (FIG. 2), but not so adherent that the rollers 11, 24 will pull up the deposited layer when they are retracted.

The flexibility of the rollers 11, 24, which are themselves preferably mounted on flexible axles, permits matching the surface to be covered. To perfect this contact, the secondary roller 24 is moreover preferably fixed to the end of an orientable fork 30 (FIG. 1).

The jaws 12a, 12b are constituted for example by shoes covered with a removable adhesive cloth.

The brake 12 permits holding the layer N during cutting and during the displacement of the head 6 toward the new point of departure for a deposition sequence.

The number of axes of mobility of the head 6 is a function of the complexity of the shapes of the pieces to be produced, as well as the paths of the rovings along the shapes of the pieces. The support of the structure 7 to be clad can also be provided with controlled axes.

The head 6 is provided with a robot controlled by the digital control to control the mechanical functions of the head.

The spools of roving 19 can be carried by the head 6 if the latter is sufficiently large and the support arm of the machine sufficiently sized. The supply of the rovings (F') upstream of the head 6 permits ensuring the low tensions of the rovings at the level of the head 6 and providing a reserve (20) of roving ensuring low tensions of the rovings. The machine movements also permit reducing the tension of the rovings so as to ensure almost zero tension upon each deposit of rovings.

The deposition head of the invention permits stopping the deposit at the desired place and restarting the deposit at another place. It permits carrying out deposits of joined rovings or of joined layers of rovings within a predetermined perimeter on any surfaces whatsoever and hence carrying out local deposits to provide reinforcements of, for example, several superposed layers of rovings or joined layers, oriented differently from one layer to the next.

The deposition head of the invention accepts rovings usable on conventional deposition heads of the "pressed roving" type.

The sticky nature of the pre-impregnated fibers being variable according to ambient climatic conditions, it is possible, if the conditions are not favorable to deposition, to add to the head 6 a regulated hot air supply permitting locally reheating during deposit, the surface to be covered, to have greater adhesion. On the other hand, if the pre-impregnated roving is too sticky, it is possible, so that it will not roll up about the deposition roller 11, to add to the head 6 a regulated cold air supply, to cool the deposition roller, thereby rendering this latter less sticky.

The process of the invention is applicable to the production of composite pieces of the sheet type as well as structural pieces used in the production of aircraft, for example fuselages or portions of fuselages. It is also possible to provide rocket tanks, tank skirts, as well as inter-stage engine skirts.

Maritime applications are envisaged, for example the production of ship hauls, containers, floats, etc. . .

The invention is obviously not limited to the embodiment shown and described above, but on the contrary covers all modifications, particularly as to the number of rovings simultaneously deposited, as well as the structure and arrangement of the braking means (12), of the cutting means (13, 14) for the rovings, or for pressing (rollers 11, 24) the rovings onto the surface to be covered.

Moreover, according to a modified operation, the head 6 could use the roller 11 only for starting the deposit, the roller 24 then being used for pressing the layer against the subjacent surface, all along its deposit. To this end, the roller 11 would be reduced in size and positioned in front of the axis of the head, and the roller 24 would be of large size and positioned on the axis of the head, as is the roller 11 in FIGS. 1 to 9.

What is claimed is:

1. Device for the deposition in contact of roving of pre-impregnated fibers, comprising a deposition head mounted on a digitally controlled machine comprising at least four axes of mobility, said deposition head being movable relative to a surface to be covered and comprising a deposition roller, means for supplying said roving to the deposition roller, arranged such that the roving remains constantly in contact with the deposition roller over a substantial portion of its peripheral surface, means for braking the roving and means for cutting the roving arranged to cut the roving downstream of the deposition roller in the direction of movement of the roving relative to the roller between the roller and said surface, wherein said deposition head further comprises means to press against the surface to be covered the portion of the deposited roving, at least at the two ends of the section of the roving and wherein said means for cutting the roving are constituted by a cutting member and an anvil, positioned on opposite sides of the roving in its portion extending between the deposition roller in the position spaced from the surface to be covered in the pressing position of the second end of the section of deposited roving, the portion of the cutting means interposed between the roving and the surface to be covered being retractable.

2. Device according to claim 1, wherein said means to press the deposited roving on the surface to be covered are constituted by a secondary roller disposed upstream of the deposition roller, in the direction of movement of this latter relative to said surface to be covered, said secondary roller being retractably mounted.

3. Device according to claim 2, wherein said secondary roller is moreover movably mounted relative to the deposition roller and automatically controlled such that, in the course of the deposition sequence, it will press the deposited roving onto the surface to be covered by rolling on at least the two end portions of the deposited section and if desired over all the length of said section.

4. Device according to claim 3, wherein in the latter portion of the path of deposition of the roving, the deposition roller is slightly spaced from the surface to be covered, the deposition of the roving being then assured by the secondary roller.

5. Device according to claim 1, wherein the deposition head is provided with a regulated hot air supply directed toward the surface to be covered.

6. Device according to claim 1, wherein the deposition head is provided with a regulated cold air supply directed to the surface of the deposition roller.

7. Device according to claim 1, wherein said means for supplying roving to the deposition roller are power driven rollers as well as also is, if desired, said roller, these rollers ensuring movement of the layer compatible with the speed of movement of the deposited layer and so as to deliver the roving with a very low tension.

8. Device according to claim 2, wherein said deposition roller is used only for starting the deposition, said secondary roller being used to carry out the deposition and positioned on the axis of the head, the deposition roller being itself positioned in front of the secondary roller in the direction of the head during deposition.

* * * * *